United States Patent Office 3,218,920
Patented Nov. 23, 1965

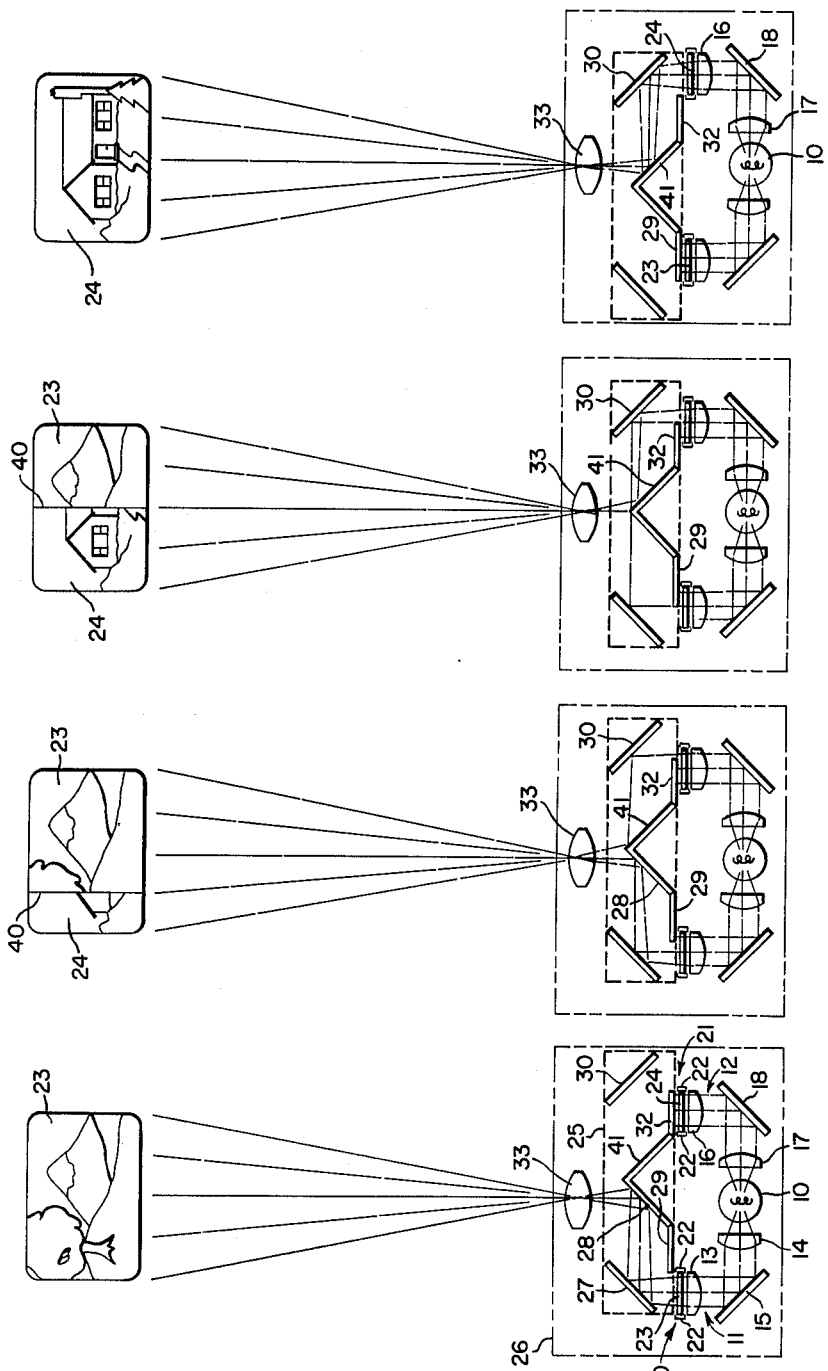

3,218,920
PHOTOGRAPHIC SLIDE PROJECTOR WITH
LAP DISSOLVE
Kenneth R. Johnson, Evergreen, Colo., assignor to
Honeywell Inc., a corporation of Delaware
Filed June 13, 1961, Ser. No. 116,716
1 Claim. (Cl. 88—26)

The present invention is concerned with an improved photographic projector of the type providing a lap transition from the projection of one photographic slide to another.

The object of the present invention is to provide structure for improved means for displaying successive slides with a minimum of discomfort to the viewer. As is well known, the so called miniature camera, utilizing 35 mm. film, can be used with film to produce positive transparencies which, when placed in a projector, may be projected on a screen or the like for viewing. A great deal of effort has been extended for the purpose of originating structures producing a minimum amount of eye strain insofar as the viewer of these slides is concerned. For example, some projectors utilize a shutter which cuts the light from a particular slide, after which the slide is moved and a succeeding slide is moved into position, whereupon the shutter then opens. In this system no movement of the picture is seen, although the viewer is subjected to alternate periods of a completely dark screen and then an illuminated screen showing a scene to be viewed. These alternate periods of dark and illuminated screen have proven to be tiring as a result of the extreme variations in light intensity which the eye is required to view. In other cases, the projectors produce a dissolving effect with a first slide distinctly projected for viewing, then a period of diffusion in which the first scene becomes very fuzzy and a second scene is displayed on top of the first scene, this scene also being very diffused or fuzzy. The transition takes place from this intermediate scene where the viewer cannot distinctly see either the first or the second slide to the point where the second slide is distinctly displayed. In this arrangement, there is no alternate black and light sequence to be viewed and thus this objectionable change in light intensity is avoided. However, in this latter case the viewer experiences eye fatigue as a result of the attempt of the eye to focus on the picture which is being displayed during the transition from one slide to the other.

The present invention is directed to the concept of providing a lap transition by a shutter which cuts the light at the film plane of the slide to thereby produce a clear distinct line type transition wherein a distinct dividing line appears to move across the screen, leaving a new scene to be viewed as the line moves across the screen. In this arrangement, there is no change in brilliance to be observed by the viewer, and there is no period in which the scene being displayed is fuzzy and appears perhaps to be completely out of focus. Furthermore, in the apparatus of the present invention, the scene itself does not move across the screen. Thus, with the structure of the present invention a lap transition between succeeding slides to be viewed is accomplished in a manner which is very pleasant to view and less tiring to the viewer.

The present invention will be apparent to those skilled in the art upon reference to the following specification, claim and drawing, of which the four figures show the preferred embodiment of the present invention in different modes of operation.

Referring to FIGURE 1, reference numeral 10 designates a single light source. The light from this single light source is formed into a first and a second light beam at a first and second optical path designated generally by means of reference numerals 11 and 12. A first condensing lens system includes lens elements 13 and 14, a mirror 15 being provided to direct the light from lens 14 through lens 13. A second condensing lens system includes the lens elements 16 and 17, a mirror 18 directing the light from lens 17 through lens 16.

While a single light source is shown, it is within the teachings of the present invention to utilize a separate bulb for each of the first and second light beams, the two bulbs then defining a light source.

Reference numerals 20 and 21 designate generally a first and a second slide receiving compartment. This slide receiving compartment may be constructed in a variety of ways and for purposes of simplicity has been shown in FIGURE 1 as including slide guides 22 which are adapted to receive a slide to be positioned at the compartment. In FIGURE 1, the first slide receiving compartment is shown as having a slide 23 positioned therein and the second slide receiving compartment is shown has having a second slide 24 positioned therein.

Reference numeral 25 designates a movable means disposed within the projector housing, the housing being shown by means of broken line 26. This movable means carries a first and a second mirror 27 and 28 associated with the first optical path and a shutter member 29 associated with the optical path 11. Further mirror members 30 and 41 and a further shutter member 32 are shown associated with the second optical path 12.

Reference numeral 33 designates an objective lens selectively operable to receive light from the first or second optical path, depending upon the position of the movable member 25. In FIGURE 1, the movable member 25 is shown at its extreme right-hand position and in this position shutter 32 is effective to cut the light at the second optical path and to allow the light from the first optical path to pass to mirrors 27 and 28 and then through the objective lens 33 to display the scene present on slide 23 at a screen or the like.

The projector as shown in FIGURE 1 is now operative to display the slide at the first optical path by means of light which is produced by the single light source 10 and passes through the condensing lens 14, mirror 15, condensing lens 13, slide 23, mirrors 27 and 28, and objective lens 33 to the screen. After slide 23 has been displayed for a length of time, the operator moves the movable member 25, by means not shown, from the extreme right-hand position of FIGURE 1 to the extreme left-hand position of FIGURE 4.

The initial movement of member 25 from the right-hand position to the left-hand position of FIGURE 4 results in a partial cutting of the light at the first optical path by means of shutter 29 and the uncovering of a portion of the light of the second optical path by means of shutter 32, this condition being shown in FIGURE 2. Furthermore, mirror 30 is moved into a position to intercept a portion of the light from the second optical path and direct this light to mirror 41, which in turn directs it through the objective lens 33 and onto the screen. Thus, at FIGURE 2 it can be seen that a portion of the scene on slide 23 has been replaced by a portion of the scene upon slide 24. Furthermore, this is accomplished without the movement of the scene being displayed upon the screen. Reference numeral 40 designates a line which appears at the screen as a clear and distinct dividing line moving across scene 23 and leaving behind it scene 24, the line 40 being the only element moving upon the screen. Thus, the observer is left with the impression of a transition from one slide to the other with a minimum amount of discomfort due to varying brilliancies or due to moving of the particular structure in the picture which he may be viewing or which are at least called to his attention as a result of movement of these portions of the picture.

In FIGURE 3, the apparatus is shown in a middle position wherein line 40 cuts the picture being displayed and one-half of slide 23 is shown while one-half of slide 24 is shown. In this position, shutters 29 and 32 are effective to cut the light from each of the two optical paths in equal amount.

A significant feature of the present invention is the position of the movable shutter members 29 and 32 in relation to the film plane, that is the position of the slide receiving compartments. It is noted that shutters 29 and 32 are effective to cut the light of the respective first and second optical paths directly at the plane of the film transparency. Thus, rather than producing a fuzzy and out of focus type transition from one slide to the other, the transition from one slide to the other is accomplished by the structure of the present invention by virtue of a clear distinct line 40 which moves across the screen, leaving both of the views, as shown in FIGURE 3, clear and distinct, neither one being out of focus. This positioning of the shutter members 29 and 32 at the film plane is a significant contribution of the present invention and avoids the objections of the prior art wherein the cutting of the optical path is displaced from the film plane and has the effect of producing a transition by means of a fuzzy out of focus transition from one slide to the other. As can be appreciated, this type of transition is very tiring to the viewer since the viewer unconsciously attempts to maintain the view which he has been just previously distinctly viewing in focus even though the projector, in dissolving from one scene to another, produces an out of focus type transition which cannot be kept in focus by the eyes of the viewer. This effect has proven to be tiring and is overcome by the structure of the present invention which cuts the light at the film plane.

In FIGURE 4, a complete transition from slide 23 to slide 24 is shown. Slide 24, positioned at the second optical path is completely uncovered in FIGURE 4 and slide 23 is completely covered by means of shutter 29. The light from the single light source 10 passes through condensing lens 17 and is directed by mirror 18 to condensing lens 16. The light then passes through transparency 24 and by means of mirrors 30 and 41 passes through objective lens 33 to display the slide 24 at the screen, as shown in FIGURE 4.

From the above description it can be seen that I have provided an improved photographic projector in which a lap transition from one slide to another is effected by movable means including a pair of shutter elements which cut the two optical paths at the film plane to produce a clear line type lap transition. In this manner, succeeding slides are shown with a minimum amount of irritation to the viewer and a resultant lack of fatigue. Other embodiments of the present invention would be apparent to those skilled in the art and it is therefore intended that the scope of the present invention be limited solely by the scope of the appended claim.

I claim as my invention:

A slide projector comprising; a single light source mounted at a fixed position, a pair of condensing lens systems mounted at a fixed position, means directing the light from said light source into each of said condensing lens systems to form a first and a second light beam, a pair of slide receiving compartments, each of which is mounted at a fixed position to intercept one of said light beams; a single objective lens mounted at a fixed position; and movable means including a pair of light controlling members, each of said light controlling members including mirror means and shutter means, with the shutter means movably disposed at said slide receiving compartments to selectively cut the light beam thereat, and with the mirror means movable with said shutter means to direct the light beam to said objective lens when said shutter means is in a position allowing the light beam to pass; said movable means being controlled to selectively project a slide disposed at one or the other of said slide receiving compartments and to produce a line lap transition from one slide to the other upon movement of said movable means.

References Cited by the Examiner
UNITED STATES PATENTS

| | | | |
|---|---|---|---|
| 1,141,885 | 6/1915 | Palmer | 88—26 |
| 1,247,646 | 11/1917 | Craig | 352—62 |
| 1,558,145 | 10/1925 | Citron | 88—26 |
| 1,738,943 | 12/1929 | Brenkert et al. | |
| 2,525,598 | 10/1950 | Gruber | 88—26 |
| 2,669,901 | 2/1954 | Rehorn | 88—26 |

FOREIGN PATENTS

| | | |
|---|---|---|
| 797,415 | 2/1936 | France. |
| 462,661 | 3/1951 | Italy. |

NORTON ANSHER, *Primary Examiner.*

EMIL G. ANDERSON, *Examiner.*